US012752161B2

(12) United States Patent
Jones et al.

(10) Patent No.: US 12,752,161 B2
(45) Date of Patent: Oct. 6, 2026

(54) GOLF BALL INCLUDING HYBRID CORE FORMED VIA THREE-DIMENSIONAL PRINTING

(71) Applicant: Acushnet Company, Fairhaven, MA (US)

(72) Inventors: Douglas E. Jones, Dartmouth, MA (US); Edward Costa, East Providence, RI (US)

(73) Assignee: Acushnet Company, Fairhaven, MA (US)

(*) Notice: Subject to any disclaimer, the term of this patent is extended or adjusted under 35 U.S.C. 154(b) by 191 days.

(21) Appl. No.: 18/666,731

(22) Filed: May 16, 2024

(65) Prior Publication Data

US 2025/0352860 A1 Nov. 20, 2025

(51) Int. Cl.

*A63B 37/06* (2006.01)
*A63B 37/00* (2006.01)
*B33Y 80/00* (2015.01)

(52) U.S. Cl.

CPC ...... *A63B 37/0064* (2013.01); *A63B 37/0069* (2013.01); *B33Y 80/00* (2014.12); *A63B 37/0075* (2013.01)

(58) Field of Classification Search

CPC .............. A63B 37/005; A63B 37/0005; A63B 37/0069

See application file for complete search history.

(56) References Cited

U.S. PATENT DOCUMENTS

| | | | |
|---|---|---|---|
| 5,334,673 | A | 8/1994 | Wu |
| 5,484,870 | A | 1/1996 | Wu |
| 6,213,893 | B1 | 4/2001 | Maruko et al. |
| 6,217,463 | B1 | 4/2001 | Maruko et al. |
| 6,267,695 | B1 | 7/2001 | Masutani |
| 6,293,877 | B1 | 9/2001 | Boehm |
| 6,296,578 | B1 | 10/2001 | Masutani |
| 6,379,270 | B2 | 4/2002 | Maruko et al. |
| 6,383,091 | B1 | 5/2002 | Maruko et al. |
| 6,406,385 | B1 | 6/2002 | Masutani et al. |
| 6,416,423 | B1 | 7/2002 | Masutani |
| 6,506,851 | B2 | 1/2003 | Wu |
| 6,508,726 | B1 | 1/2003 | Yamagishi et al. |
| 6,575,847 | B1 | 6/2003 | Yamagishi |
| 6,595,874 | B2 | 7/2003 | Sullivan et al. |
| 6,605,243 | B1 | 8/2003 | Masutani |
| 6,685,580 | B2 | 2/2004 | Sullivan |
| 6,743,123 | B2 | 6/2004 | Sullivan |
| 6,756,436 | B2 | 6/2004 | Rajagopalan et al. |
| 6,773,364 | B2 | 8/2004 | Sullivan et al. |
| 6,786,838 | B2 | 9/2004 | Sullivan et al. |
| 6,835,794 | B2 | 12/2004 | Wu et al. |
| 7,022,034 | B2 | 4/2006 | Sullivan et al. |

(Continued)

*Primary Examiner* — Raeann Gorden

(57) ABSTRACT

A golf ball is disclosed herein that includes a core comprised of two distinct layers. A first core layer is formed from three-dimensional printing and has a non-spherical profile. A second core layer is formed from traditional core layer formation techniques around the first core layer. The first core layer can have a profile that is comprised of a central hub, which can be spherical or non-spherical, and a plurality of spokes extending therefrom. The spokes can have an elongated shape and can have a length greater than a diameter of the hub. The spokes can further include branches extending therefrom.

19 Claims, 5 Drawing Sheets

(56) References Cited

U.S. PATENT DOCUMENTS

| | | | | |
|---|---|---|---|---|
| 7,371,192 | B2 * | 5/2008 | Sullivan | A63B 37/0003 473/376 |
| 7,377,863 | B2 | 5/2008 | Sullivan et al. | |
| 7,378,483 | B2 | 5/2008 | Wu et al. | |
| 7,410,429 | B1 | 8/2008 | Bulpett et al. | |
| 8,568,250 | B2 | 10/2013 | Chou et al. | |
| 8,979,675 | B2 * | 3/2015 | Bender | A63B 45/00 473/370 |
| 8,986,136 | B2 | 3/2015 | Alan | |
| 9,095,749 | B2 | 8/2015 | Bulpett et al. | |
| 9,211,442 | B2 | 12/2015 | Felker et al. | |
| 9,283,440 | B2 | 3/2016 | Ishii et al. | |
| 9,289,656 | B2 | 3/2016 | Ishii et al. | |
| 9,457,237 | B2 | 10/2016 | Alan | |
| 9,457,238 | B2 | 10/2016 | Alan | |
| 9,468,814 | B2 | 10/2016 | Ishii et al. | |
| 9,492,716 | B2 | 11/2016 | Ishii et al. | |
| 9,573,023 | B2 | 2/2017 | Ishii et al. | |
| 9,573,024 | B2 | 2/2017 | Bender | |
| 9,586,096 | B2 | 3/2017 | Ishii et al. | |
| 9,630,061 | B2 | 4/2017 | Sullivan et al. | |
| 9,636,546 | B2 | 5/2017 | Sullivan et al. | |
| 9,636,549 | B2 | 5/2017 | Bulpett et al. | |
| 9,737,766 | B2 | 8/2017 | Sullivan et al. | |
| 9,844,702 | B2 | 12/2017 | Ishii et al. | |
| 9,939,291 | B2 | 4/2018 | Sullivan et al. | |
| 9,968,831 | B2 | 5/2018 | Sullivan et al. | |
| 10,010,764 | B2 | 7/2018 | Sullivan et al. | |
| 10,076,684 | B2 | 9/2018 | Sullivan et al. | |
| 10,668,334 | B2 | 6/2020 | Madson et al. | |
| 10,695,617 | B1 | 6/2020 | Madson | |
| 2001/0031668 | A1 * | 10/2001 | Sullivan | A63B 37/0009 473/354 |
| 2005/0250600 | A1 * | 11/2005 | Sullivan | A63B 37/0003 473/371 |
| 2020/0215395 | A1 | 7/2020 | Madson et al. | |

* cited by examiner

GOLF BALL INCLUDING HYBRID CORE FORMED VIA THREE-DIMENSIONAL PRINTING

FIELD OF THE INVENTION

The present disclosure generally relates to a specific golf ball construction, and more particularly relates to a dual core for a golf ball that is formed at least partially via three-dimensional printing.

BACKGROUND OF THE INVENTION

Various golf ball constructions are well known, and typically include a core and a cover, or a core, an intermediate layer and a cover. Golf balls typically are comprised of enveloping spherical layers or bodies.

While protrusions or brambles are also known for alternative golf ball designs, it would be desirable to provide golf ball designs that provide greater opportunities for unique and improved golf ball layer constructions of non-spherical layers.

SUMMARY OF THE INVENTION

Various features are disclosed herein that are directed to golf ball designs and constructions in which the core or a portion of the core is formed via three-dimensional printing or some other type of non-molding, additive manufacturing process.

In one aspect, a golf ball is disclosed that includes a core having at least a first core layer and a second core layer, wherein the first core layer is arranged radially inward from the second core layer. The first core layer includes a hub and a plurality of spokes extending away from the hub. A cover is disposed around the core.

The first core layer can be formed via three-dimensional printing. In one aspect, the second core layer is not formed via three-dimensional printing. In this manner, the core can be considered a hybrid component formed via two distinct classes or types of manufacturing processes, i.e., one process that includes molding and one process that does not include molding. Additionally, the materials used in each of the processes can be categorically distinct from each other.

The plurality of spokes can extend in both a radial and circumferential direction away from the hub, in one aspect. Stated differently, in one aspect, the spokes do not merely extend radially away from the hub, and instead include a secondary orientation or direction of extension. In one aspect, the spokes can have a curved profile. In one aspect, the spokes can have a straight or linear profile. In one aspect, the spokes can have an asymmetrical, crooked, misshapen, twisted, serpentine, jagged, or other irregular profile.

The plurality of spokes can each include at least one branch. In one aspect, the branches have a smaller thickness than the spokes. Each spoke can include a plurality of branches, in one example.

The at least one branch can extend in a partially non-radial direction away from a respective one of the plurality of spokes. In one aspect, the branches can extend circumferentially from the spokes.

The at least one branch can include one, two, three, four, five, or more than five branches that are each connected to a single one of the spokes. One of ordinary skill in the art would understand that additional branches could be provided.

The hub can have a spherical profile, in one aspect. In another aspect, the hub can have a non-spherical profile. The profile of the hub can be asymmetrical, nonuniform, misshapen, contorted, serpentine, twisted, or any other irregular shape. In one aspect, the hub can have a first quantity of faces or sides, and a second quantity of spokes can match the first quantity. In other words, the number of faces on the hub can match the number of spokes extending from the hub.

The quantity of spokes extending from the hub can vary, as one of ordinary skill in the art would appreciate. In one aspect, the plurality of spokes can include twelve spokes to thirty-six spokes. This number can vary, be even, odd, etc. Likewise, the quantity of sides or faces of the hub can include twelve sides or faces to thirty-six sides or faces.

In one aspect, the quantity of spokes can be a number that is divisible into 360 (i.e., 360 degrees of the outer spherical surface of the golf ball). In one aspect, a minimum angular distance between any adjacent spokes can be no greater than 60 degrees. In one aspect, a minimum angular distance between any adjacent spokes can be no greater than 45 degrees. In one aspect, a minimum angular distance between any adjacent spokes can be no greater than 30 degrees.

Based on this configuration, an axis of impact from any golf club with the golf ball can be generally close or adjacent to one of the spokes. Stated differently, a golf club face striking the golf ball can be configured to at least partially overlap with a primary axis of one of the spokes. This overlap can ensure that any material properties associated with the spokes are manifested. In one example, the quantity of spokes can be 12, 24, 36, 48, 64, 96, or 128.

In one example, the spokes, which can be formed from a plastic material or an ionomer material in one aspect, can have a relatively higher stiffness as compared to the second core layer, which can be formed from rubber. The material forming the spokes and hub can generally have a greater stiffness than material forming the second core layer, i.e., the enveloping core layer. In one aspect, the material forming the spokes and hub can provide improved distance performance on long shots while simultaneously not sacrificing any feel or spin on shorter shots.

In one specific aspect, the hub can include twelve spokes, each arranged equidistant from each other. In one aspect, the spokes are not equidistant from each other. In one aspect, the twelve spokes can be angularly offset from an adjacent spoke by at least 30 degrees, or at least 45 degrees.

The size of the hub can vary, as one of ordinary skill in the art would appreciate based on this disclosure. In one aspect, the hub has a diameter (D) of 0.250 inches-1.580 inches. In one aspect, the hub has a diameter (D) of less than 0.500 inches. In one aspect, the hub has a diameter (D) of less than 0.350 inches.

A length (L) of the plurality of spokes can be at least two times greater than a thickness (T) of the plurality of spokes. In one aspect, a length (L) of the plurality of spokes is at least five times greater than a thickness (T) of the plurality of spokes. In another aspect, a length (L) of the plurality of spokes is at least two times greater than a diameter (D) of the hub. In one aspect, the length (L) of the spokes can be at least 0.250 inches. In one aspect, the length (L) of the spokes can be at least 0.500 inches. In one aspect, the length (L) of the spokes can be at least 0.750 inches.

In another aspect, a length (L') of the plurality of branches can be at least two times greater than a thickness (T') of the plurality of branches. In one aspect, the length (L') of the branches can be less than 0.500 inches. In one aspect, the length (L') of the branches can be greater than 0.150 inches.

The hub of the first core layer can have a hub volume and the plurality of spokes of the first core layer can have a spokes volume, and the hub volume can be less than the spokes volume. In one aspect, a ratio of the hub volume to the spokes volume is 0.5-1.5. In one aspect, a ratio of the hub volume to the spokes volume can be at least 0.75. In one aspect, a ratio of the hub volume to the spokes volume can be greater than 1.25.

The first core layer can have a first core layer volume and the second core layer can have a second core layer volume, and the core can have a total core volume, and the second core layer volume can be at least 70% of the total core volume. In one aspect, the second core layer volume can be at least 90% of the total core volume. In another aspect, the second core layer volume can no greater than 75% of the total core volume. In one aspect, the second core layer volume defines a majority of the total core volume.

In another aspect, a golf ball is provided that comprises a core including at least a first core layer and a second core layer, wherein the first core layer is arranged radially inward from the second core layer. The first core layer includes a hub and a plurality of spokes and is formed via three-dimensional printing, or some other type of process that does not include molding techniques.

The spokes can each include at least one branch that extends away from a respective one of the spokes. A length (L) of the spokes can be at least two times greater than a thickness (T) of the spokes, and the length (L) of the spokes can be at least two times greater than a diameter (D) of the hub. The hub of the first core layer can have a hub volume and the plurality of spokes of the first core layer can have a spokes volume, and the hub volume can be less than or equal to the spokes volume. The first core layer can have a first core layer volume and the second core layer can have a second core layer volume, and the core can have a total core volume, and the second core layer volume can be at least 70% of the total core volume. The golf ball can further include a cover disposed around the core.

A method of forming a golf ball core is also disclosed herein. The method can comprise forming a first core layer via three-dimensional printing, wherein the first core layer includes a hub with a plurality of spokes and a plurality of branches extending away from the plurality of spokes, and forming a second core layer around the first core layer via compression molding.

A method of forming a golf ball is also disclosed herein which uses the golf ball core described herein. The method can include forming an intermediate layer about the golf ball core and subsequently forming a cover around the encased core or sub-assembly including the intermediate layer and golf ball core.

Additional aspects and features are disclosed herein.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1B:
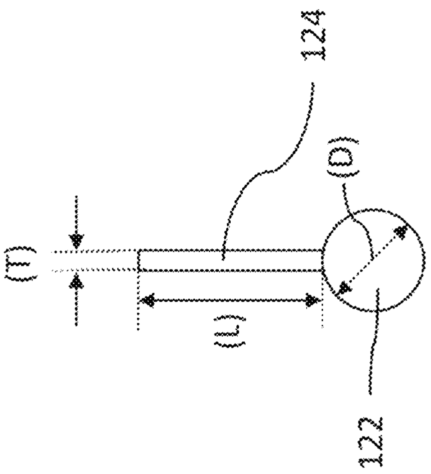
FIG. 1B is a magnified view of the first core layer from FIG. 1A.

In one aspect, the present disclosure is directed to a golf ball including a core formed partially or completely via three-dimensional printing, or some other non-molding process or technique. Any additional layers or pieces of the golf ball can be formed via traditional processes, such as molding, casting, etc.

In some aspects, the golf ball described herein includes a core, an intermediate layer disposed around the core, and a cover surrounding the intermediate layer. Exemplary characteristics of the core, cover, and intermediate layer are further described herein. One of ordinary skill in the art would understand that the intermediate layer can be omitted.

The intermediate layer can form a mantle or a casing, in one aspect. The intermediate layer can encase the core. In one aspect, at least one additional intermediate layer can be included in the golf ball construction. The cover can consist of a single layer, dual layer, or multi-layer construction.

In one example, a portion of the core, such as the second core layer, can be formed from rubber, as is well known in the art. The core composition can include various additives. In one example, the cover is formed from polyurethane, polyurea, or hybrid of polyurethane-polyurea, as is well known in the art. Various compositions and constructions for cores, intermediate layers, and covers are disclosed in U.S. Pat. Nos. 9,636,549; 9,737,766; 9,968,831; and 10,076,684, which are each incorporated by reference in their entirety as if fully set forth herein. In other aspects, as disclosed herein, a portion of the core or an entirety of the core can be formed via three-dimensional printing techniques or processes.

Conventional and non-conventional materials may be used for forming intermediate layers of the golf ball including, for instance, ionomer resins, highly neutralized polymers, polybutadiene, butyl rubber, and other rubber-based core formulations, and the like. In one embodiment, the intermediate layer includes an ionomer. In this aspect, ionomers suitable for use in accordance with the present disclosure may include partially neutralized ionomers and highly neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized. Exemplary ionomers are salts of O/X- and O/X/Y-type acid copolymers, wherein O is an α-olefin, X is a $C_3$-$C_8$ α, β-ethylenically unsaturated carboxylic acid, and Y is a softening monomer. O can be selected from ethylene and propylene. X can be selected from methacrylic acid, acrylic acid, ethacrylic acid, crotonic acid, and itaconic acid. Methacrylic acid and acrylic acid are particularly preferred. Y can be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer can be at least about 15 weight percent, at least about 25 weight percent, at least about 40 weight percent, or at least about 60 weight percent, based on total weight of the copolymer. The amount of $C_3$ to $C_8$ α, β-ethylenically unsaturated mono- or dicarboxylic acid in the acid copolymer is typically from 1 weight percent to 35 weight percent, from 5 weight percent to 30 weight percent, from 5 weight percent to 25 weight percent, or from 10 weight percent to 20 weight percent, based on total weight of the copolymer. The amount of optional softening comonomer in the acid copolymer may be from 0 weight percent to 50 weight percent, from 5 weight percent to 40 weight percent, from 10 weight percent to 35 weight percent, or from 20 weight percent to 30 weight percent, based on total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As disclosed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to 100 percent or greater, for example 110 percent or 120 percent or greater. In other embodiments, partially neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

The cover can be formed from various materials including, but not limited to: polyurethanes, such as those prepared from polyols or polyamines and diisocyanates or polyisocyanates and/or their prepolymers, and those disclosed in U.S. Pat. Nos. 5,334,673 and 6,506,851; polyureas, such as those disclosed in U.S. Pat. Nos. 5,484,870 and 6,835,794; and/or polyurethane-urea hybrids, blends or copolymers comprising urethane or urea segments.

One of ordinary skill in the art would understand that the core, intermediate layer, and cover can be formed from any suitable materials as are known in the art. Suitable core, intermediate layer, and cover materials and compositions are known from existing commercial products, such as the 2023 Titleist® Pro VIR, and the 2023 Titleist® Pro V1x®.

FIGS. 1A, 1B, 2A, 2B, 3, 4, 5, 6, 7, and 9 each generally disclose a golf ball 100, 200, 300, 400, 500, 600, 700, 900 that includes a core 110, 210, 310, 410, 510, 610, 710, 910 having at least a first core layer 120, 220, 320, 420, 520, 620, 720, 920, and a second core layer 130, 230, 330, 430, 530, 630, 730, 930, wherein the first core layer is arranged radially inward from the second core layer. The first core layer includes a hub 122, 222, 322, 422, 522, 622, 722, 922 and a plurality of spokes 124, 224, 324, 424, 524, 624, 724, 924 extending away from the hub 122, 222, 322, 422, 522, 622, 722, 922. A cover 150 can be disposed around the core 110, and in one aspect can be disposed around an intermediate layer 140.

The first core layer can be formed via three-dimensional printing. In one aspect, the second core layer is not formed via three-dimensional printing. In this manner, the core can be considered a hybrid component formed via two distinct classes or types manufacturing processes. As used in this manner, the term distinct classes or types is meant to distinguish between, for example, molding processes and three-dimensional printing. In another aspect, the second core layer can also be formed via three-dimensional printing.

In one aspect, the first core layer can be formed via three-dimensional printing techniques, such as selective laser melting, electron beam melting, stercolithography, fused deposition modeling, fused filament fabrication, directed energy deposition, metal filament extrusion, binder jetting, additive printing, and other three-dimensional printing techniques could be used. In one aspect, materials for forming the first core layer can include thermoplastics, ionomers, resins, partially neutralized ionomers and highly neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers, thermoplastic polyurethane, polylactic acid (PLA), acrylonitrile butadiene styrene (ABS), nylon, polyphenylene ether (PPE) and blends thereof, thermoplastic elastomer (TPE), polyether block amide (PEBA), polycarbonate (PC), PC-ABS, polyphenylsulfone (PPSU), polyphenylene sulfide (PPS), polyetheretherketone (PEEK), and/or polyetherimide (PEI). One of ordinary skill in the art would appreciate that various techniques could be used.

Figure 1A:
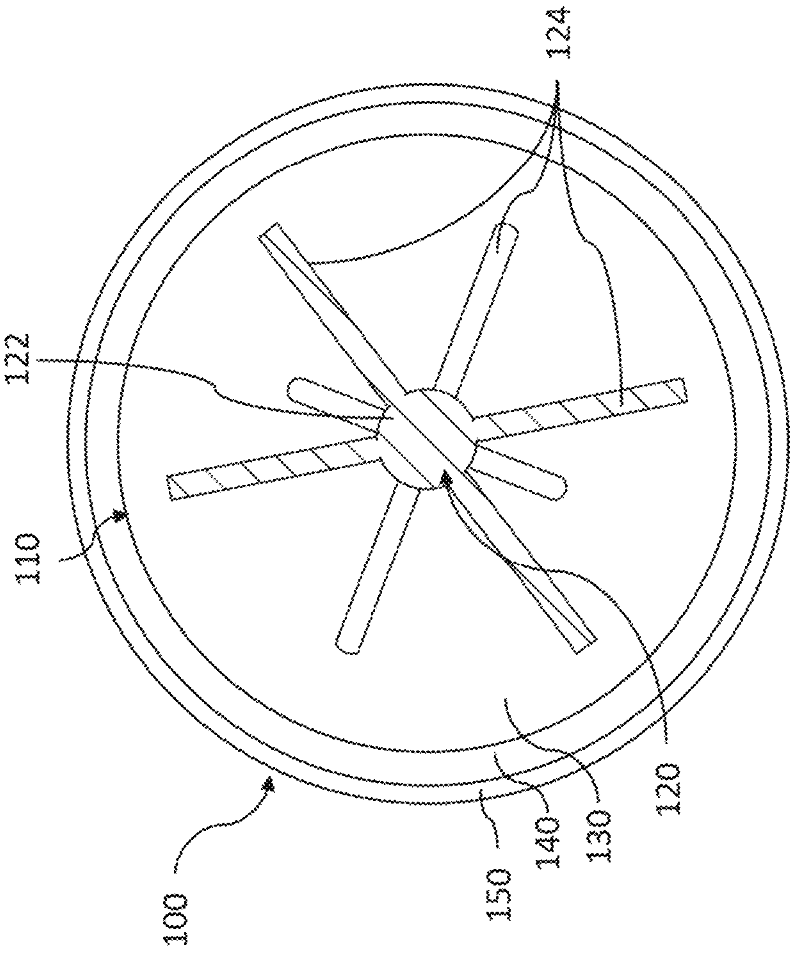
FIG. 1A is a view of a golf ball having a first core layer formed via three-dimensional printing according to one example.

In one aspect, such as shown in FIGS. 1A and 1B, the plurality of spokes 124 can extend in a purely radial direction from the hub 122. In another aspect, such as shown in FIG. 4, the plurality of spokes 424 can extend in both a radial and circumferential direction away from the hub 422, in one aspect. Stated differently, in one aspect the spokes do not merely extend radially away from the hub, and instead include a secondary orientation or direction of extension. In one aspect, the spokes can have a curved profile, such as shown in FIG. 4. In one aspect, the spokes can have a straight or linear profile, such as shown in FIGS. 1A and 1B, or FIGS. 2A, 2B, 3, 5, 6, 7, 8, and 9. In one aspect, the spokes can have an asymmetrical, crooked, misshapen, twisted, serpentine, jagged, or other irregular profile.

Figure 2A:
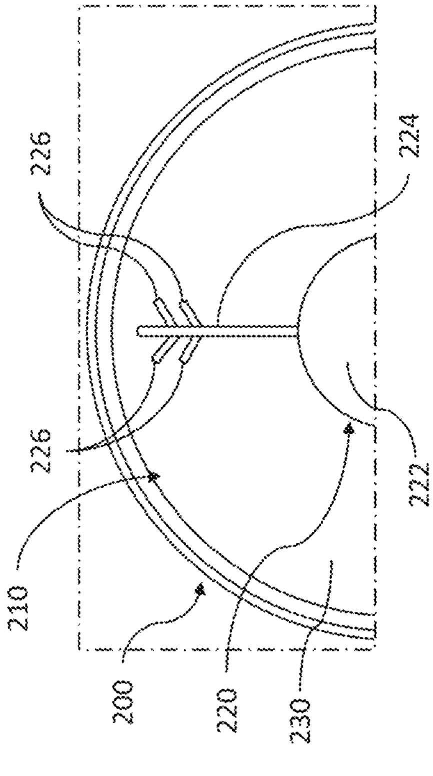
FIG. 2A is a cross-sectional view of a portion of a golf ball having a first core layer formed via three-dimensional printing according to another example.
Figure 2B:
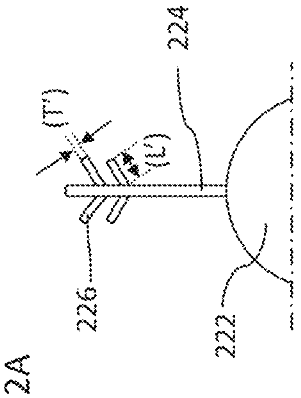
FIG. 2B is an additional view of a portion of the first core layer from FIG. 2A.
Figure 7:
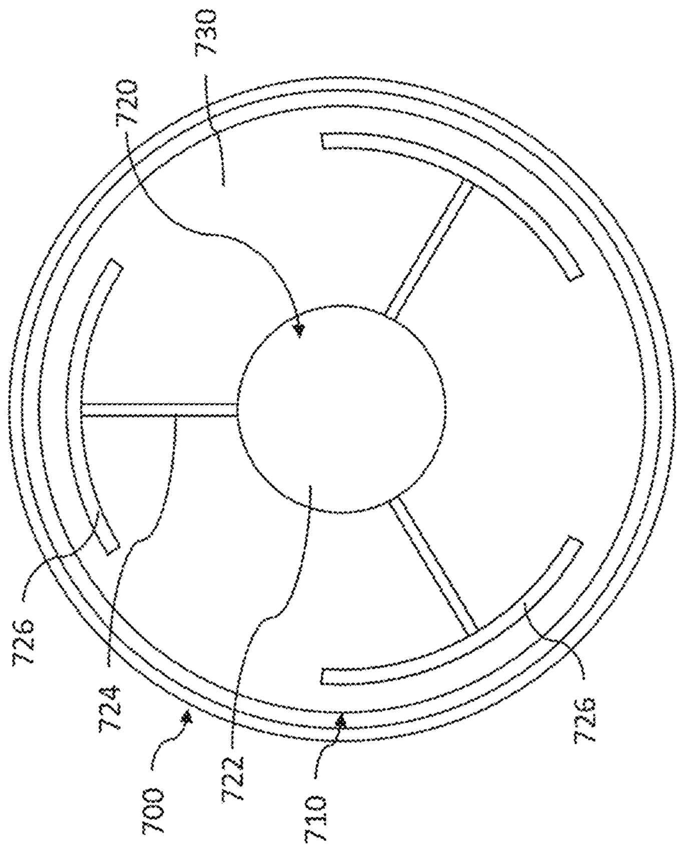
FIG. 7 is a cross-sectional view of a golf ball having a first core layer formed via three-dimensional printing according to another example.

The plurality of spokes can each include at least one branch, such as branches 226 extending from spoke 224 as shown in FIGS. 2A and 2B. In one aspect, the branches have a smaller thickness and a smaller length than the spokes. Each spoke can include a plurality of branches, in one example. The at least one branch can extend in a partially non-radial direction away from a respective one of the plurality of spokes. In one aspect, the branches can extend circumferentially from the spokes. One exemplary configuration is shown in FIG. 7, in which branches 726 extend circumferentially from spokes 724.

As used herein, the terms spoke and branch can refer to two distinct components of the first core layer. In one aspect, the term spoke refers to a member or component that is directly connected or attached to the hub. The term branch refers to a member or component that is not directly connected or attached to the hub, and instead extends from a spoke. Differentiation between the spoke and branch can be determined based on where a terminal end of the spoke or branch touches. Additionally, any given branch attached to a respective spoke can extend in a different direction from a primary axis of the spoke. In one aspect, a primary axis of a spoke and a primary axis of a branch attached to said spoke are not aligned. Stated differently, the primary axis of the spoke is oriented in a first direction and the primary direction of the branch is oriented in a second direction that is different than the first direction.

The at least one branch can include one, two, three, four, five, or more than five branches that are each connected to a single spoke. In one aspect, at least ten branches are connected to a single spoke. One of ordinary skill in the art would understand that additional branches could be provided. In one aspect, the spokes can have an asymmetrical, crooked, misshapen, twisted, serpentine, jagged, or other irregular profile. Exemplary branches having irregular shapes are shown as branches 326*a*-326*d* in FIG. 3. In one aspect, the spokes and branches can have a veined or vein-like configuration in which dozens of branches extend in various, non-uniform directions away from each spoke.

The hub can have a spherical profile, in one aspect, such the hubs 122, 222, 322, 422, and 722 shown in FIGS. 1A, 1B, 2A, 2B, 3, 4, and 7. In another aspect, the hub can have a non-spherical profile, such as the hubs 522, 622, 922 shown in FIGS. 5, 6, and 9. The profile of the hub can be asymmetrical, nonuniform, misshapen, contorted, serpentine, twisted, or any other irregular shape. In one aspect, the hub can have any three-dimensional polygonal or polyhedron shape, such as a triangular pyramid, dodecahedron, tetrahedron, cube, octahedron, icosahedron, zonohedron, lattice polyhedral, etc.

The quantity of spokes extending from the hub can vary, as one of ordinary skill in the art would appreciate. In one aspect, the plurality of spokes can include twelve to thirty-six spokes.

The size of the hub can vary, as one of ordinary skill in the art would appreciate based on this disclosure. In one aspect, the hub has a diameter (D) of 0.250 inches-1.580 inches. In one aspect, the hub has a diameter (D) of 0.100 inches-1.250 inches. An exemplary measurement for the diameter (D) of the hub 122 is shown in FIG. 1B.

The diameter of the hub can be no greater than 20% of a diameter of the second core layer in one aspect. The diameter of the hub can be no greater than 40% of a diameter of the second core layer in one aspect. The diameter of the hub can be no greater than 50% of a diameter of the second core layer in one aspect. In another aspect, the diameter of the hub is at least 75% of a diameter of the second core layer. In another aspect, the diameter of the hub is at least 25% of a diameter of the second core layer.

A length (L) of the plurality of spokes can be at least two times greater than a thickness (T) of the plurality of spokes. In one aspect, a length (L) of the plurality of spokes is at least five times greater than a thickness (T) of the plurality of spokes. In another aspect, a length (L) of the plurality of spokes is at least two times greater than a diameter (D) of the hub. Exemplary measurements or dimensions for a spoke 124, such as a thickness (T) and length (L) for the spoke 124 are shown in FIG. 1B. In one aspect, a length (L) of all of the spokes is identical. In another aspect, lengths (L) of the spokes vary. In one aspect, a thickness (T) of all of the spokes is identical. In another aspect, thicknesses (T) of the spokes vary.

In another aspect, a length (L') of the plurality of branches can be at least two times greater than a thickness (T') of the plurality of branches. Exemplary measurements or dimensions, such as the thickness (T') and length (L') for a branch 226 are shown in FIG. 2B. In one aspect, the length (L') of all of the branches is identical. In another aspect, lengths (L') of the branches vary. In one aspect, the thicknesses (T') of all of the branches is identical. In another aspect, the thicknesses (T') of the branches vary. The branches can generally have a smaller size (i.e., length and/or thickness) than the spoke that the specific branch is attached to.

In one aspect, a length (L) of the spokes is greater than a length (L') of the branches. In another aspect, the length (L) of the spokes is equal or less than a length (L') of the branches. In one aspect, a thickness (T) of the spokes is greater than a thickness (T') of the branches. In another aspect, the thickness (T) of the spokes is equal or less than a thickness (T') of the branches.

In one aspect, the first core layer has the following relationship between the diameter (D) of the hub, the length (L) of the spoke, and the thickness (T) of the spoke: L<D<T. In another aspect, the first core layer has the following relationship between the diameter (D) of the hub, the length (L) of the spoke, and the thickness (T) of the spoke: L≤D≤T. In another aspect, the first core layer has the following relationship between the diameter (D) of the hub, the length (L) of the spoke, and the thickness (T) of the spoke: D≤L≤T. In another aspect, the first core layer has the following relationship between the diameter (D) of the hub, the length (L) of the spoke, and the thickness (T) of the spoke: D≤T≤L.

In one aspect, the first core layer has the following relationship between the diameter (D) of the hub, the length (L) of the spoke, the thickness (T) of the spoke, the length (L') of the branch, and the thickness (T') of the branch: L<D<L'<T<T'. In one aspect, the first core layer has the following relationship between the diameter (D) of the hub, the length (L) of the spoke, the thickness (T) of the spoke, the length (L') of the branch, and the thickness (T') of the branch: L≤D≤L'≤T≤T'. In one aspect, the first core layer has the following relationship between the diameter (D) of the hub, the length (L) of the spoke, the thickness (T) of the spoke, the length (L') of the branch, and the thickness (T') of the branch: D≤L≤L'≤T≤T'. In one aspect, the first core layer has the following relationship between the diameter (D) of the hub, the length (L) of the spoke, the thickness (T) of the spoke, the length (L') of the branch, and the thickness (T') of the branch: L≤L'≤D≤T≤T'. In one aspect, the first core layer has the following relationship between the diameter (D) of the hub, the length (L) of the spoke, the thickness (T) of the spoke, the length (L') of the branch, and the thickness (T') of the branch: L'≤L≤D≤T'≤T.

The hub of the first core layer can have a hub volume ($V_{hub}$) and the plurality of spokes of the first core layer can have a spokes volume ($V_{spokes}$), and the hub volume ($V_{hub}$) can be less than the spokes volume ($V_{spokes}$). In one aspect, a ratio of the hub volume ($V_{hub}$) to the spokes volume ($V_{spokes}$) is 0.5-1.5.

In one aspect, if the hub is a spherical shape, the volume of the hub ($V_{hub}$) can be calculated as $V_{hub}=(4/3)\pi r^3$ where r is a radius of the hub. Likewise, if the spokes have a cylindrical profile, the volume of the spokes ($V_{spokes}$) can be calculated as $V_{spokes}=\pi r^2 h$, where h is a height of the spoke and r is a radius of the spoke. Similarly, if the branches have a cylindrical profile, the volume of the branches ($V_{branches}$) can be calculated as $V_{branch}=\pi r^2 h$, where h is a height of the branch and r is a radius of the branch. In other aspects in which the hub, spokes, or branches have an irregular or non-spherical shape, other known volumetric measurement techniques can be used.

In one aspect, the volume of the hub ($V_{hub}$), the volume of the spokes ($V_{spokes}$), and the volume of the branches ($V_{branches}$) can have the following relationship: $V_{spokes} \leq V_{hub} \leq V_{branches}$. In one aspect, the volume of the hub ($V_{hub}$), the volume of the spokes ($V_{spokes}$), and the volume of the branches ($V_{branches}$) can have the following relationship: $V_{hub} \leq V_{spokes} \leq V_{branches}$. In one aspect, the volume of the hub ($V_{hub}$), the volume of the spokes ($V_{spokes}$), and the volume of the branches ($V_{branches}$) can have the following relationship: $V_{hub} \leq V_{branches} \leq V_{spokes}$. In one aspect, the volume of the hub ($V_{hub}$), the volume of the spokes ($V_{spokes}$), and the volume of the branches ($V_{branches}$) can have the following relationship: $V_{spokes} \leq V_{branches} \leq V_{hub}$. In one aspect, the volume of the hub ($V_{hub}$), the volume of the spokes ($V_{spokes}$), and the volume of the branches ($V_{branches}$) can have the following relationship: $V_{branches} \leq V_{spokes} \leq V_{hub}$.

In one aspect, the volume of the hub ($V_{hub}$), and the volume of the spokes ($V_{spokes}$) can have the following relationship: $(V_{hub}/V_{spokes})=0.35-0.75$. In one aspect, the volume of the hub ($V_{hub}$), and the volume of the spokes ($V_{spokes}$) can have the following relationship: $(V_{hub}/V_{spokes})=0.15-0.90$. In one aspect, the volume of the hub ($V_{hub}$), and the volume of the spokes ($V_{spokes}$) can have the following relationship: $(V_{hub}/V_{spokes})=1.00-1.50$. In one aspect, the volume of the hub ($V_{hub}$), and the volume of the spokes ($V_{spokes}$) can have the following relationship: $(V_{hub}/V_{spokes})=1.25\text{-}2.50$.

The first core layer can have a first core layer volume ($V_{first}$) and the second core layer can have a second core layer volume ($V_{second}$), and the core can have a total core volume ($V_{total}$), and the second core layer volume ($V_{second}$) can be at least 70% of the total core volume ($V_{total}$). In one aspect, the second core layer volume ($V_{second}$) defines a majority of the total core volume ($V_{total}$). In one aspect, the first core layer volume ($V_{first}$) and the second core layer volume ($V_{second}$) can have the following relationship: $V_{first}/V_{second} \leq 0.5$. In one aspect, the first core layer volume ($V_{first}$) and the second core layer volume ($V_{second}$) can have the following relationship: $V_{first}/V$ second≤0.9. In one aspect, the first core layer volume ($V_{first}$) and the second core layer volume ($V_{second}$) can have the following relationship: $V_{first}/V_{second} \leq 0.25$.

A method of forming a golf ball core is also disclosed herein. The method can comprise forming a first core layer via three-dimensional printing, wherein the first core layer includes a hub with a plurality of spokes and a plurality of branches extending away from the plurality of spokes, and forming a second core layer around the first core layer via compression molding. A method of forming a golf ball including the golf ball core disclosed herein can also be provided. The method of forming the golf ball can include forming an intermediate layer about the core to produce a cased core or sub-assembly, and further forming a cover about the encased core or sub-assembly.

Referring to FIGS. 1A and 1B, a golf ball 100 is disclosed in which the hub 122 of the first core layer 120 includes plurality of spokes 124. In one aspect, the plurality of spokes 124 can include twelve spokes. In other examples, the number of spokes can be small or larger than twelve. Additionally, in one example, there are an even number of spokes, and in other examples, there are an odd number of spokes. In one aspect, each of the spokes 124 are symmetrically arranged about the hub 122. One of ordinary skill in the art would understand that the spokes can be asymmetrically arranged about the hub 122. The golf ball 100 further includes an intermediate layer 140 and a cover 150.

FIG. 1B illustrates further detail regarding a diameter (D) of the hub 122, and a length (L) and thickness (T) of the spoke 124. In one aspect, the diameter (D) of the hub 122 can be 25%-75% the length (L) of the spoke 124. In one aspect, the diameter (D) of the hub 122 can be 40%-60% the length (L) of the spoke 124. The diameter (D) of the hub 122 can be at least two to five times greater than the thickness (T)

of the spoke 124. In one aspect, the length (L) of the spoke 124 can be at least five times greater than the thickness (T) of the spoke 124. The various sizes of the hub 122 and the spokes 124 can vary. Although no branches are illustrated in FIGS. 1A and 1B, one of ordinary skill in the art would understand that branches could be provided on the spokes 124.

FIGS. 2A and 2B illustrate another exemplary golf ball including a first core layer 220 having a hub 222, and at least one spoke 224 having a plurality of branches 226. Although only one spoke is shown FIGS. 2A and 2B, one of ordinary skill in the art would understand that many other spokes can be provided. For example, the spoke configuration for FIG. 2A can be relatively similar to the configuration shown in FIG. 1A. As shown in FIGS. 2A and 2B, there can be a plurality of branches 226 on each spoke 224. For example, in one aspect, there can be four branches 226 on each spoke 224. The branches 226 can be configured to extend away from the spoke 224 at an angle. In one aspect, a primary axis of the spoke 224 is arranged in a first plane and a primary axis of the branch 226 is arranged in a second plane that is different than the first plane. As shown in FIGS. 2A and 2B, the branches 226 can generally extend at an angle in a radially outward and circumferential direction. In one aspect, each of the branches 226 can be the same size and have the same orientation. In another aspect, the branches 226 can have different sizes and orientations.

Figure 3:
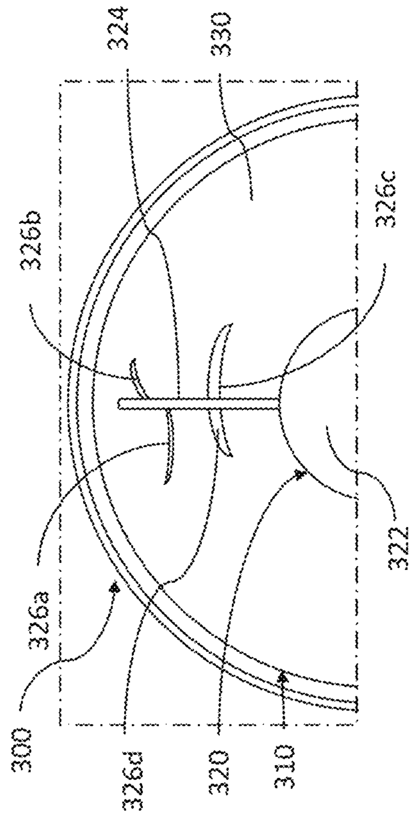
FIG. 3 is a cross-sectional view of a portion of a golf ball having a first core layer formed via three-dimensional printing according to another example.
Figure 4:
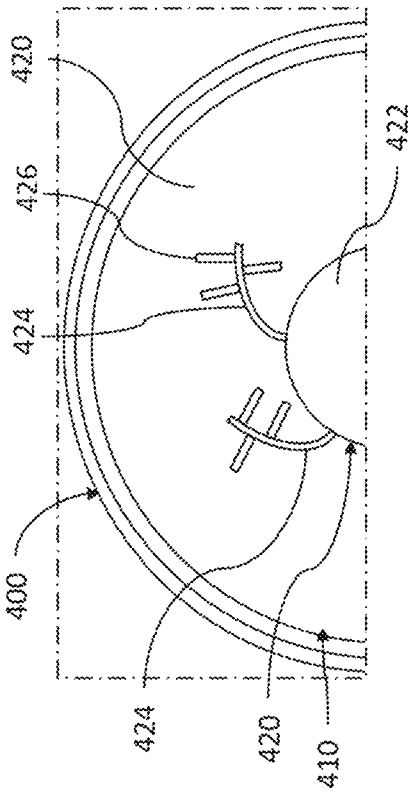
FIG. 4 is a cross-sectional view of a portion of a golf ball having a first core layer formed via three-dimensional printing according to another example.

FIG. 3 illustrates an example of the golf ball including a first core layer 320 that includes dissimilarly shaped and dissimilarly oriented branches 326*a*-326*d* extending from a spoke 324. The branches 326*a*-326*d* can be in an asymmetric configuration relative to each other and have varying thicknesses, lengths, and other properties. In one aspect, the branches 326*a*-326*d* can have a curved profile and have varying thicknesses and orientations relative to the spoke 324.

FIG. 4 illustrates another exemplary golf ball including a first core layer 420 that includes a plurality of spokes 424 each having a plurality of branches 426. As shown in FIG. 4, the spokes 424 can extend in a direction other than exclusively or purely radially from the hub 422. For example, the spokes 424 can have a curved or non-linear profile. In one aspect, the spokes 424 can extend partially radially and partially circumferentially. The branches 426 can extend peripherally outward from each spoke 424, such that some of branches 426 extend in a primarily radially outward direction and some of the branches 426 extend in a primarily radially inward direction. Stated differently, some of the branches 426 can extend towards the outer surface of the golf ball while some of the branches 426 can extend towards the hub 422. As shown in FIG. 4, each spoke 424 can include three branches 426, in one aspect.

Figure 5:
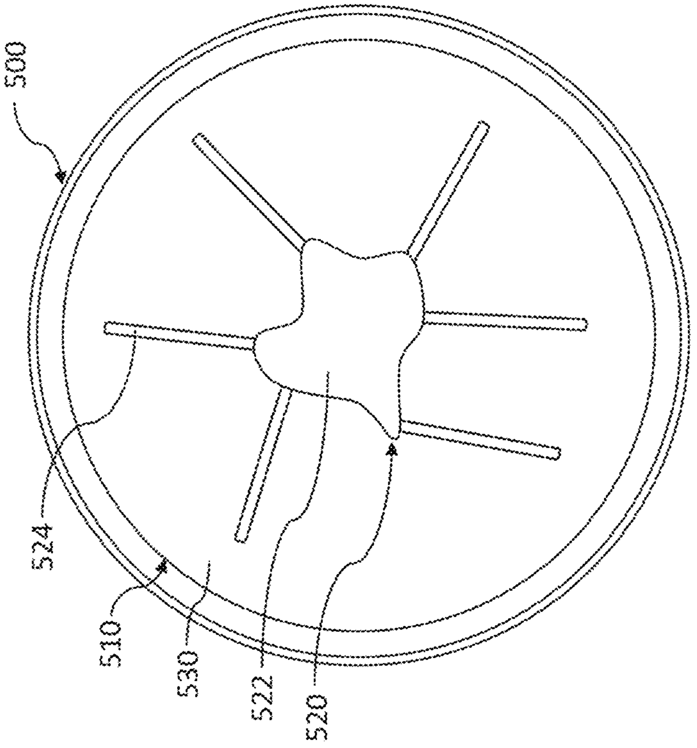
FIG. 5 is a cross-sectional view of a golf ball having a first core layer formed via three-dimensional printing according to another example.

Referring now to FIG. 5, the first core layer 520 can be comprised of a non-spherical hub 522 and a plurality of spokes 524. The spokes 524 can be arranged symmetrically or asymmetrically about the hub 522. As shown in FIG. 5, the hub 522 can be formed as an amorphous mass or lump, in one aspect. The hub 522 can alternatively be formed as any three-dimensional polygonal shape having a predefined quantity of sides.

Figure 6:
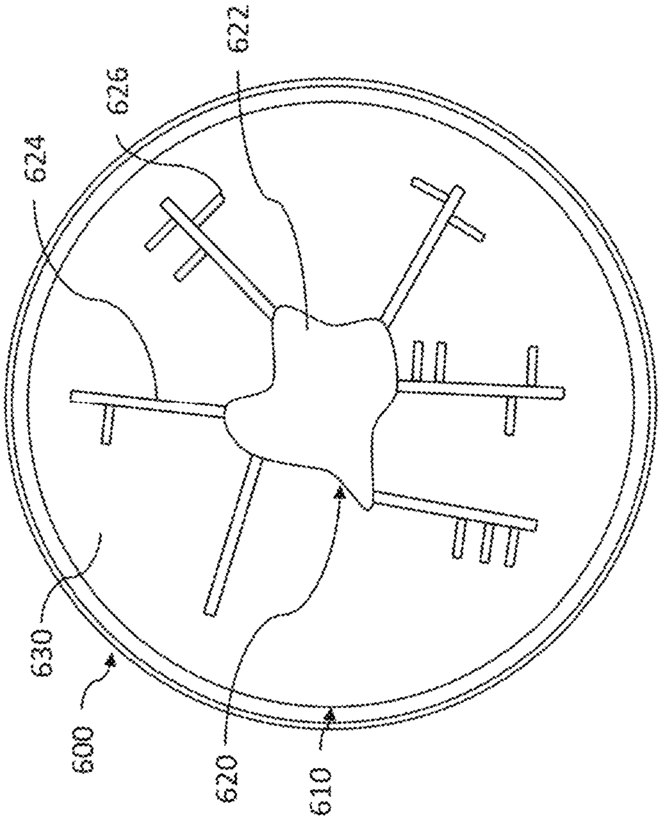
FIG. 6 is a cross-sectional view of a golf ball having a first core layer formed via three-dimensional printing according to another example.

As shown in FIG. 6, the first core layer 620 can include a hub 622 having a similar shape or profile as the hub 522 of FIG. 5, but the spokes 624 shown in FIG. 6 can also include branches 626. As shown in FIG. 6, each spoke 624 can include a different quantity and/or placement/orientation of branches 626.

Referring now to FIG. 7, a first core layer 720 is provided that includes a plurality of spokes 724. In one aspect, the spokes 724 are uniformly or symmetrically arranged about the hub 722. One of ordinary skill in the art would understand that the orientation, spacing, quantity, etc., of the spokes 724 can vary. As shown in FIG. 7, branches 726 can be provided at a terminal end of the spokes 724. The branches 726 can have an arcuate profile, in one aspect. The branches 726 can be positioned relatively closer to the intermediate layer than the hub 722 in one aspect. In one aspect, an extent of the arcuate profile of the branches 726 can be greater than a length of the spokes 724. In one aspect, an extent of the arcuate profile of the branches 726 can be greater than a diameter of the hub 722.

Figure 8:
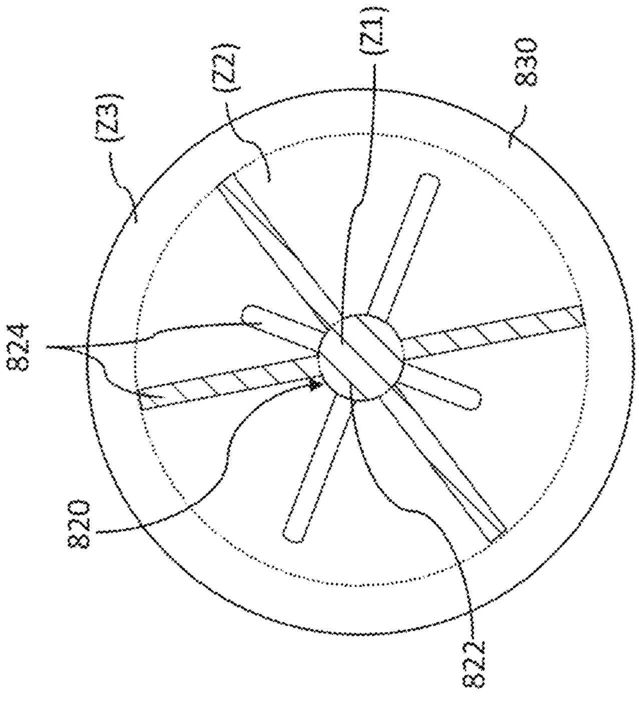
FIG. 8 is a view of a core of a golf ball having a first core layer formed via three-dimensional printing according to another example.

As shown by FIG. 8, a golf ball core formed via the techniques disclosed herein can result in a golf ball having various zones, such as a first core zone (Z1) consisting solely of the hub 822 of the first core layer 820, a second core zone (Z2) or a hybrid zone consisting of the spokes 824 and/or branches of the first core layer 820 and an inner portion of the second core layer 830, and a third core zone (Z3) consisting only of an outer portion of the second core layer 830. In one aspect, the second core zone (Z2) consists primarily of the inner portion of the second core layer 830, and a minority of the zone is filled by the spokes 824 and/or branches. In another aspect, the second core zone (Z2) consists primarily of the spokes 824 and/or branches, and a minority of the zone is filled by the inner portion of the second core layer 830.

In one aspect, a volume of the second core zone (Z2) is comprised of: 5% of the spokes and/or branches, and 95% of the inner portion of the second core layer. In one aspect, a volume of the second core zone (Z2) is comprised of: 5%-25% of the spokes and/or branches, and 75%-95% of the inner portion of the second core layer. In one aspect, a volume of the second core zone (Z2) is comprised of: 15%-50% of the spokes and/or branches, and 50%-85% of the inner portion of the second core layer.

Figure 9:
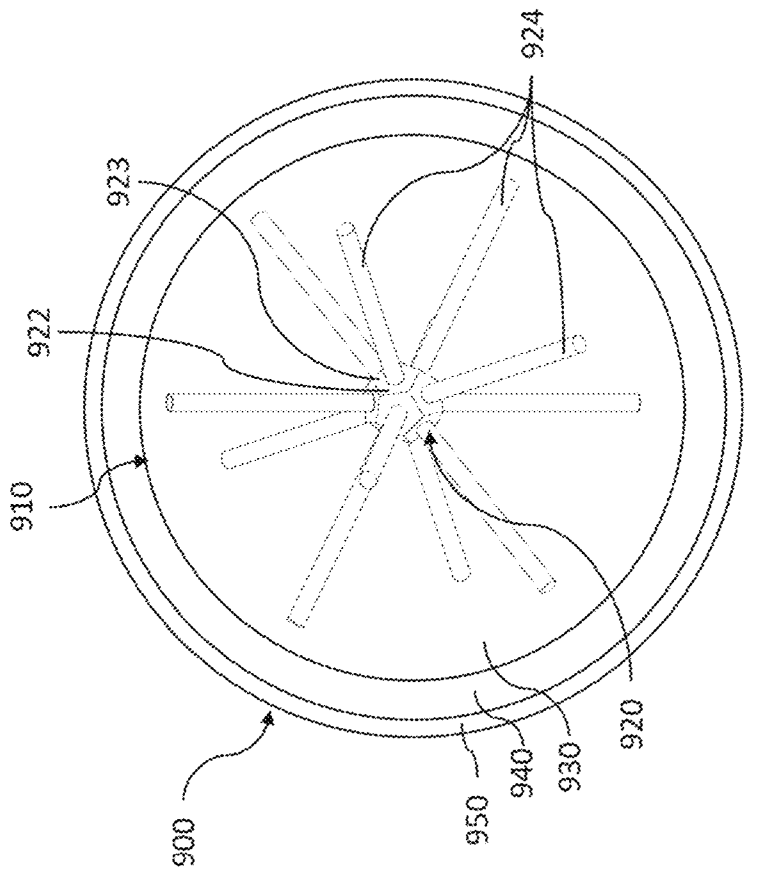
FIG. 9 is a view of a first core layer having hub with a predetermined quantity of faces or sides, and a predetermined quantity of spokes.

FIG. 9 illustrates yet another aspect of a golf ball 900 having a core 910 comprising a first core layer 920 including a hub 922 and plurality of spokes 924 and a second core layer 930, an intermediate layer 940, and a cover layer 950. In one aspect, the hub 922 is a non-spherical body. In one aspect, the hub 922 is a polygonal body that has a plurality of faces or sides 923. In one aspect, the hub 922 has twelve faces or sides 923. The quantity of faces or sides 923 of the hub 922 can vary. In one aspect, the quantity of faces or sides 923 of the hub 922 can equal the quantity of spokes 924. In one aspect, the faces or sides 923 each have a predetermined number of edges, which can preferably be five as shown in FIG. 9. One of ordinary skill in the art would understand that the number of edges can vary, and can be less than or greater than five. In one aspect, the spokes 924 can be centered on a respective one of the sides or faces 923 of the hub 922. Based on the configuration shown in FIG. 9, club face impacts will generally be in the vicinity (i.e., either directly aligned with or slightly offset from) a respective one of the spokes 924.

In one aspect, the terminal ends of the spokes and/or the branches can have a flat end, pointed end, or any other shaped end or profile. In one aspect, the thickness of the spokes and/or the branches can be uniform along the extent of the spokes or branches, or the thickness can vary.

In one aspect, the hub is formed as a three-dimensional polygonal shape having a first quantity of faces or sides. In one aspect, the plurality of spokes can include a second quantity of spokes. In one aspect, the first quantity of faces or sides and the second quantity of spokes can be equal. Furthermore, one spoke can be assigned to one side of the hub and each spoke can be centered on a face or side of the hub. In other aspects, the first quantity of faces or sides can be dissimilar from the second quantity of spokes.

In any one or more of the Figures, the exemplary golf balls can include a core formed at least partially from rubber and/or any one or more materials suitable for three-dimensional printing techniques, such as plastic, polymer powder, resin, ionomer resin, carbon fiber, nylon, polycarbonate, polyamide, polypropylene, acrylonitrile butadiene styrene (ABS), polyethylene terephthalate (PET), poly vinyl alcohol (PVA), thermoplastic urethane, metals (such as steel or titanium or aluminum or alloys thereof), ceramics, composites, or other materials. In one aspect, the materials for forming the core can include any one or more of thermoplastics, ionomers, resin, ionomer resins, thermoplastic polyurethane, polylactic acid (PLA), acrylonitrile butadiene styrene (ABS), nylons, polyphenylene ether (PPE) and blends thereof, thermoplastic elastomer (TPE), polyether block amide (PEBA), polycarbonate (PC), PC-ABS, polyphenylsulfone (PPSU), polyphenylene sulfide (PPS), polyetheretherketone (PEEK), and/or polyetherimide (PEI). In one aspect, the first core layer, including a hub, spokes, and branches, can be formed from Surlyn®. The first core layer can be formed from ionomers, such as partially neutralized ionomers and highly neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. In one aspect, the first core layer can be formed from a material that is generally stiffer than the material of the second core layer.

The golf ball can further comprise a cast urethane cover, and an intermediate layer formed from an ionomer. In other aspects, the cover can be formed from an ionomer. One of ordinary skill in the art would understand that other materials could be used to form any of these layers or components of the golf ball.

The second core layer can be formed primarily from a mixture of polybutadiene rubber and styrene butadiene rubber. Additives can be included in the rubber core composition. The rubber core composition can be crosslinked with a peroxide with the addition of zinc diacrylate as a coagent. Fillers and additives such as pigments, zinc oxide, and barium sulfate, zinc pentachlorothiophenol can also added to adjust gravity and affect final cured core properties, as one of ordinary skill in the art would understand. One of ordinary skill in the art would understand that the composition, the diameter, and other characteristics of the second core layer can vary depending on the specific design requirements for the golf ball.

The cover can be formed from a one-shot method, prepolymer method, or other known method. In one aspect, the cover is formed from a hot cast polyurethane comprising the reaction product of an isocyanate functional prepolymer and an amine functional chain extender, as one of ordinary skill in the art would understand. Additionally, one of ordinary skill in the art would understand that the cover can be formed from other materials, such as ionomer, and/or can be formed from other formation techniques.

The intermediate layer can be formed from an ionomer or an ionomer blend. Specifically, the intermediate layer can be formed from a 50/50 blend of high acid sodium ionomer and high acid zinc ionomer. One of ordinary skill in the art would understand that this ratio can vary, and the specific ionomers can vary. In other aspects, compositions that do not include ionomers can be used to form the intermediate layer.

In one aspect, the present disclosure provides a configuration in which the surface area between the first and second core layers can be increased such that contact is not only provided between the outer surface of the hub of the first core layer and the inner surface of the second core layer, but the spokes and branches provide increased contact surfaces with the second core layer.

In one aspect, the hub and the branches and/or spokes can be formed from dissimilar materials or compositions. For example, the hub can be formed from a first composition and the branches and/or spokes can be formed from a second composition that is different than the first composition. The terms compositions and materials are used interchangeably herein.

In one aspect, the first core layer is formed from a first composition and the second core layer is formed from a second composition. The first composition can be an ionomer composition and the second composition can be a rubber composition.

In one aspect, the first and second core layers' materials or compositions can vary. For example, the material forming the first core layer can result in a first core layer having a higher coefficient of restitution (CoR) as compared to the material forming the second core layer. In one aspect, the material forming the first core layer can result in a first core layer having a lower CoR as compared to the material forming the second core layer.

In one aspect, the hardness of the material forming the first core layer or the first core layer itself can have a higher hardness (either material hardness or on-component hardness) as compared to the second core layer. In one aspect, the hardness of the material forming the first core layer or the first core layer itself can have a lower hardness (either material hardness or on-component hardness) as compared to the second core layer.

In one aspect, the hardness of the material forming the first core layer has a Shore C hardness of at least 60, or at least 70, or at least 80, or at least 90, or at least 100, and the hardness of the material forming the second layer has a Shore C hardness of no greater than 90, or no greater than 80, or no greater than 70, or no greater than 60, or no greater than 50.

In one aspect, the material forming the first core layer can have a higher flexural modulus as compared to the material forming the second core layer. In one aspect, the material forming the first core layer can have a lower flexural modulus as compared to the material forming the second core layer. In one aspect, the material forming the second core layer can have a flexural modulus that is no greater than 75% of the flexural modulus of the material forming the first core layer. In one aspect, the material forming the second core layer can have a flexural modulus that is no greater than 50% of the flexural modulus of the material forming the first core layer. In one aspect, the material forming the second core layer can have a flexural modulus that is no greater than 40% of the flexural modulus of the material forming the first core layer. In one aspect, the material forming the second core layer can have a flexural modulus that is no greater than 25% of the flexural modulus of the material forming the first core layer. In one aspect, the material forming the second core layer can have a flexural modulus that is no greater than 5% of the flexural modulus of the material forming the first core layer. In one aspect, the material forming the second core layer can have a flexural modulus that is no greater than 10% of the flexural modulus of the material forming the first core layer.

In one aspect, the composition forming the first core layer can have a flexural modulus of 1,000 psi-200,000 psi (according to ASTM D790). In one aspect, the composition forming the first core layer can have a flexural modulus of 25,000 psi-100,000 psi. In one aspect, the composition forming the first core layer can have a flexural modulus of at least 100,000 psi. In one aspect, the composition forming the first core layer can have a flexural modulus of at least 250,000 psi. In one aspect, the composition forming the first core layer can have a flexural modulus of at least 500,000 psi. In one aspect, the composition forming the second core layer can have a flexural modulus of no greater than 50,000 psi. In one aspect, the composition forming the second core layer can have a flexural modulus of no greater than 30,000 psi. In one aspect, the composition forming the second core layer can have a flexural modulus of no greater than 20,000 psi.

In one aspect, the material forming the first core layer can produce a higher compression as compared to the material forming the second core layer. In one aspect, the material forming the first core layer can produce a lower compression as compared to the material forming the second core layer.

In one aspect, the present disclosure provides for improved controllability in golf ball design due to the ability to increase or decrease the appendages (i.e., spokes and/or branches) from the hub of the first core layer. This allows for a more refined level of adjusting the performance characteristics of a golf ball due to the additional degree of variation in the composition of the core as compared to a traditional dual core golf ball that consists of an inner spherical body and an outer spherical body enveloping the inner spherical body.

In one aspect, the hub of the first core layer can be formed from rubber or other materials, while the spokes and/or branches can be formed from filler-type materials in order to produce a core having an overall lower speed as compared to a golf ball dual core lacking any spokes or branches. Such designs may be suitable for complying with any reduced distance or reduced initial velocity requirements from golf's governing bodies.

In one aspect, the material forming the inner, first core layer can have a higher compression, higher flexural modulus, and higher hardness as compared to the material forming the outer, second core layer.

In one aspect, the material forming the inner, first core layer can have a lower compression, lower flexural modulus, and lower hardness as compared to the material forming the outer, second core layer.

In another aspect, the present disclosure provides an additional design configuration for increasing the speed of any given golf ball design or configuration. For instance, the hub and spokes can provide stiffness for the golf ball through impact without negatively affecting overall golf ball compression or cover hardness. In a more particular aspect, the present disclosure can be used to produce a core layer shape that uses materials designed to increase the relative speed of the golf ball while avoiding negative impact on feel and/or control.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:

a core including at least a first core layer and a second core layer, wherein the first core layer is arranged radially inward from the second core layer, the first core layer includes a hub and a plurality of spokes extending therefrom, wherein the plurality of spokes includes at least twelve spokes, and wherein the first core layer is formed from a first composition having a first flexural modulus, and the second core layer is formed from a second composition having a second flexural modulus, wherein the first flexural modulus is greater than the second flexural modulus; and a cover disposed around the core, wherein the hub of the first core layer has a hub volume and the plurality of spokes of the first core layer has a spokes volume, and a ratio of the hub volume to the spokes volume is 0.5-1.5.

2. The golf ball according to claim 1, wherein the first core layer is formed via three-dimensional printing.

3. The golf ball according to claim 1, wherein the plurality of spokes extend in both a radial and circumferential direction away from the hub.

4. The golf ball according to claim 1, wherein the plurality of spokes each include at least one branch.

5. The golf ball according to claim 4, wherein the at least one branch extends in a partially non-radial direction away from a respective one of the plurality of spokes.

6. The golf ball according to claim 4, wherein the at least one branch includes one to five branches connected to each of the plurality of spokes.

7. The golf ball according to claim 1, wherein the hub has a spherical profile.

8. The golf ball according to claim 1, wherein the hub has a non-spherical profile having a first quantity of sides and the first quantity of sides equals a second quantity of the plurality of spokes.

9. The golf ball according to claim 8, wherein each of the plurality of spokes is centered on a respective face of the sides of the hub.

10. The golf ball according to claim 1, wherein the second flexural modulus is no greater than 10% of the first flexural modulus.

11. The golf ball according to claim 1, wherein the hub has a diameter of no greater than 0.500 inches.

12. The golf ball according to claim 1, wherein a length of the plurality of spokes is at least two times greater than a thickness of the plurality of spokes.

13. The golf ball according to claim 1, wherein the first composition is an ionomer composition and the second composition is a rubber composition.

14. The golf ball according to claim 1, wherein a length of the plurality of spokes is at least two times greater than a diameter of the hub.

15. The golf ball according to claim 1, wherein the hub volume is less than the spokes volume.

16. The golf ball according to claim 1, wherein the plurality of spokes each have a cylindrical profile.

17. A golf ball comprising:

a core including at least a first core layer and a second core layer, wherein the first core layer is arranged radially inward from the second core layer, the first core layer includes a hub and a plurality of spokes extending therefrom, wherein the plurality of spokes includes at least twelve spokes, and wherein the first core layer is formed from a first composition having a first flexural modulus, and the second core layer is formed from a second composition having a second flexural modulus, wherein the first flexural modulus is greater than the second flexural modulus; and a cover disposed around the core, wherein the core has a first core zone consisting solely of the hub, a second core zone consisting of both the plurality of spokes of the first core layer and an inner portion of the second core layer, and a third core zone consisting only of an outer portion of the second core layer, and wherein a volume of the second core zone is comprised of: 5%-25% of the plurality of spokes, and 75%-95% of the inner portion of the second core layer.

18. A golf ball comprising:

a core including at least a first core layer and a second core layer, wherein the first core layer is arranged radially inward from the second core layer, the first core layer is formed from a first composition having a first flexural modulus, and the second core layer is formed from a second composition having a second flexural modulus that is at least 50% less than the first flexural modulus;

the first core layer includes a hub and a plurality of spokes and is formed via three-dimensional printing, the plurality of spokes includes at least twelve spokes and no greater than thirty-six spokes, wherein the plurality of spokes each include at least one branch that extends away from a respective one of the plurality of spokes;

wherein a length of the plurality of spokes is at least two times greater than a thickness of the plurality of spokes, and the length of the plurality of spokes is at least two times greater than a diameter of the hub, wherein the hub of the first core layer has a hub volume and the plurality of spokes of the first core layer has a spokes volume, and the hub volume is less than or equal to the spokes volume;

wherein the first core layer has a first core layer volume and the second core layer has a second core layer volume, and the core has a total core volume, and the second core layer volume is at least 70% of the total core volume, and a cover disposed around the core.

19. A method of forming a golf ball core, the method comprising:

forming a first core layer via three-dimensional printing, wherein the first core layer includes a hub with a plurality of spokes extending away from the hub and a plurality of branches extending away from a respective one of the plurality of spokes, wherein the plurality of spokes includes at least twelve spokes; and forming a second core layer around the first core layer via compression molding, wherein the first core layer is formed from a first composition having a first flexural modulus, and the second core layer is formed from a second composition having a second flexural modulus that is at least 50% less than the first flexural modulus.

* * * * *